Sept. 5, 1944.    H. SHRUBSALL    2,357,432
ELECTRIC WELDING
Filed Jan. 12, 1943

INVENTOR
HARRY SHRUBSALL
BY
ATTORNEY

Patented Sept. 5, 1944

2,357,432

UNITED STATES PATENT OFFICE 2,357,432

ELECTRIC WELDING

Harry Shrubsall, Lewiston, N. Y., assignor to The Linde Air Products Company, a corporation of Ohio Application January 12, 1943, Serial No. 472,096

5 Claims. (Cl. 219—10)

This invention relates to electric welding.

It is frequently necessary in industry to provide a deposit of metal over a large surface area of a metal member, for instance in the manufacture or repair of articles in which wear over a relatively large surface area is encountered. It has been the practice to make such deposits by welding, a layer of weld-deposited metal being produced on the member. A familiar example is a railway rail the ends of which are worn down in service at a rate faster than the rate of wear on other parts of the rail.

As formerly practiced, the process of making weld deposits over large areas is slow and tedious, and a faster process is desired. An improved method of making weld deposits of larger area than is normally produced by ordinary electric or gas welding methods, as for example when a pad of weld metal is desired to be found on an article, is desired.

There is disclosed in Jones, Kennedy, and Rotermund Patent 2,043,960 an electric welding process characterized by the fact that molten metal is deposited on and coalesced with molten metal of a workpiece from a bare metal electrode through a molten pool of a mineral-like welding composition that is a high-resistance conductor of electricity when molten, while a deep blanket of unfused welding composition is maintained over the molten metal, pool, and end of the electrode. The process disclosed in that patent has been widely used and is notable for the quality of the weld produced and the speed with which the weld is made. The excellent character of welds produced by this process recommends its use for producing weld deposits of large surface area. The process has been used for this purpose by depositing a plurality of parallel layers of weld metal, but there are disadvantages to this procedure, and modification of the process to make it more readily usable for this purpose is sought.

It is an important object of the present invention to provide an improved method of producing, by welding, a metal deposit of large surface area. Another object of the invention is a method of producing such a deposit from a metal electrode through a molten pool of a mineral-like welding composition and under a deep blanket of unfused composition. Still another object of the invention is a method of resurfacing with metal a worn metal article by electric welding under a blanket of welding composition.

These objects are achieved by the invention which is a method of electric welding including the steps of establishing on a metal workpiece a layer of a comminuted mineral-like welding composition which is a nonconductor of electricity when in the solid state (or "cold") but a high resistance conductor of electricity when molten, inserting an end of a bare metal electrode in the form of a strip or ribbon in the welding composition, fusing a portion of the welding composition, passing an electric current through the electrode, fused portion, and workpiece and thereby causing metal to be melted and deposited from the electrode and coalesced with molten metal of the workpiece, and oscillating or rocking the electrode from side edge to side edge so that its opposite side edges are alternately brought toward and away from said workpiece and the point of melting of metal from the electrode travels to and fro, or reciprocates, from edge to edge of the electrode. The invention will be more fully described with reference to the accompanying drawing, in which:

Figure 1:
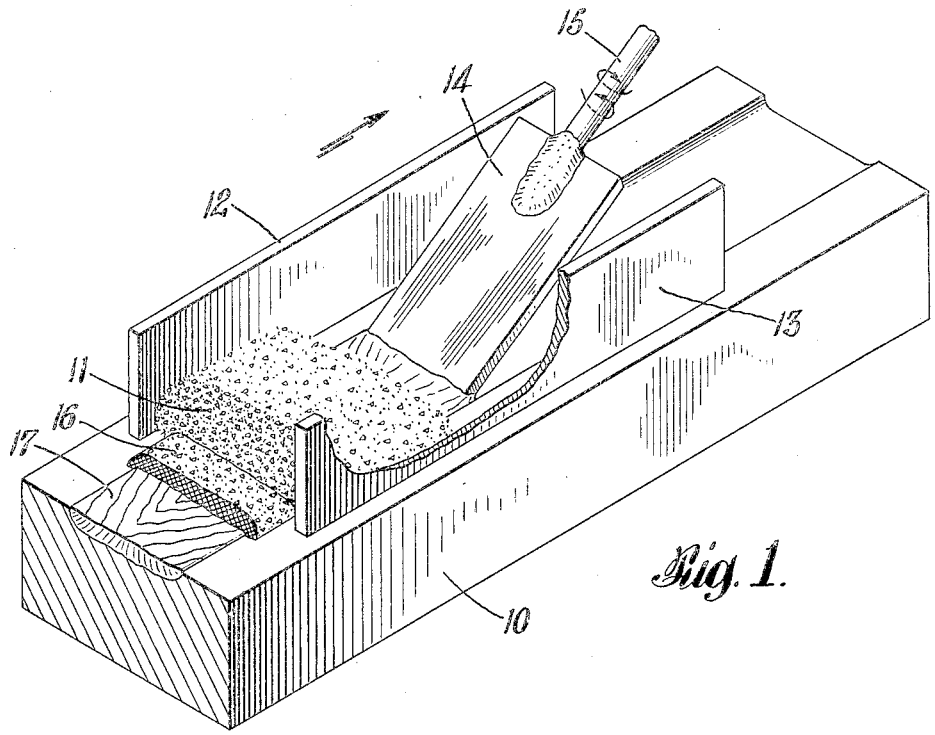
Fig. 1 is a view in perspective of a workpiece on which a welding operation is being conducted in accordance with one manner of practicing the invention, parts being broken away for clarity.

Referring to the drawing, in one method of practicing the invention, a workpiece 10 on which metal is to be deposited is covered in the area of intended deposition with a blanket of unfused, comminuted welding composition 11 which may be retained in position by dams 12, 13. Welding composition may be placed over the entire area on which metal is to be deposited before welding is started or may be progressively added as welding proceeds, whichever is more convenient. A bare metal electrode 14 having the form of a ribbon or strip is then inserted into the welding composition 11, one end being buried in the welding composition and the electrode being held at an acute angle to the workpiece with the unused portion over the area of intended deposition. For convenience in holding the electrode 14, a short length of rod 15 may be attached to the electrode 14, for example, by welding, and the rod 15 in turn held in a conventional electrode holder not shown. Electrical connections not shown are made to the electrode 14 and the workpiece 10 in conventional manner.

Assuming the workpiece 10 and the electrode 14 to have been set up in the manner described, to begin welding it is necessary to start an electric current to the work by an external means because the comminuted welding composition is electrically nonconductive. One convenient way of starting the welding operation is to insert a small wad of steel wool between the electrode and the workpiece. On supplying a suitable electric current to the electrode, the steel wool is fused, and sufficient heat is developed to fuse a portion of the welding composition. This fused portion of welding composition serves as the conductor of the welding current, and welding is started.

Figure 2:
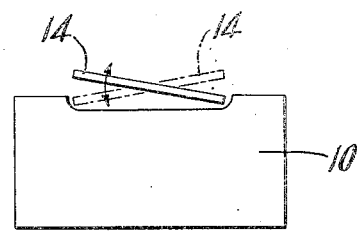
Fig. 2 is a diagrammatic end view of a metal workpiece on which metal is to be deposited showing different positions of the electrode used but for clarity omitting the covering blanket of unfused welding composition.

Welding having been started as described, the electrode 14 is rocked about its central longitudinal axis as shown diagrammatically in Fig. 2 of the drawing while being held at an acute angle to the work 10. As the electrode is rocked, the electrical discharge takes place across the gap between the electrode and the work through the fused welding composition at the point where the gap is the shortest, causing successive portions of the welding composition to be fused and successive portions of metal to be melted from that part of the electrode and coalesced with metal melted from the work at that point. The rocking movement of the electrode and the melting of metal from it cause the point of discharge to reciprocate from edge to edge of the electrode along its width, thus providing a deposit of metal approximately as wide as the electrode. The electrode need not ordinarily be moved along the line of intended deposition although it may be. Usually it will only be necessary to allow the electrode to melt back along its length until the desired deposit has been produced. As the weld progresses, the fused welding composition solidifies to form a protective slag layer 16 (Fig. 1) overlying the deposited metal 17. The solidified welding composition is easily removable from the deposited metal, usually cracking off of its own accord due to its contraction on cooling.

Although the method of the invention has been illustrated in Figs. 1 and 2 of the drawing as being practiced by holding the welding electrode at an acute angle to the workpiece on which metal is to be deposited, in some applications it may be more suitable to hold the electrode vertically to the work or at an obtuse angle. The method of the invention is equally adaptable to such applications, the electrode being held by any convenient holding device and so rocked from side edge to side edge that its opposite side edges are alternately brought toward and away from said workpiece and the melting and depositing of metal from it reciprocates from edge to edge of the electrode.

In the method of the invention, fusion of the welding composition and the melting and depositing of metal take place at all times under a covering blanket of unfused welding composition with little or no visual evidence that a weld is being made. The distance between the fusing end of the electrode and the work determines the IR drop across the electrode and the work; this distance accordingly has an important bearing on the quality of weld produced. The operator may be guided by experience in maintaining the proper distance, but it is desirable that he have additional guidance. For example, a voltmeter may be connected across the electrode and the work in conventional manner. By observing the welding voltage as indicated by the voltmeter and by adjusting the position of the electrode so as to maintain substantially constant a desired voltage, welds of the highest quality may be readily produced.

When the method of the invention is being operated with the electrode held vertically to the work, voltage regulation is obtained simply by raising or lowering the electrode as the case may be. When the electrode is being held at an acute angle to the work, if the voltage indicated by the voltmeter is higher than desired, the angle between the electrode and the work is too acute. This condition may be corrected merely by raising the unconsumed end of the electrode to make the angle less acute, the unfused welding composition underlying the fusing end of the electrode acting as a fulcrum about which the electrode may be rotated. As the angle between the electrode and the work is made less acute, the distance between the fusing end of the electrode and the work is decreased, decreasing the welding voltage. Similarly, if the voltage indicated by the voltmeter is too low, the condition may be corrected by making the angle between the electrode and the work more acute. For best results, the angle between the electrode and the work ordinarily should not exceed about 45° but with careful control the angle may be greater than 45°. No matter how acute the angle employed, there is no danger of short circuiting the electrode and the work because the unfused welding composition which completely covers the area of intended deposition is an electrical insulator.

Instead of using a voltmeter in the circuit, voltage or current-responsive audible means such as a buzzer or bell may be connected in the welding circuit to indicate fluctuations in weld be obtained with direct current.

The method of the invention has been successfully method of the invention may be, for instance, any welding composition of the kind disclosed in Patent No. 2,043,960. For example, a preferred welding composition comprises as its principal ingredients silica, at least one basic constituent consisting of an alkaline earth such as lime or magnesia or a mixture thereof, and alumina. The acidic and basic constituents should be reacted, the composition should be substantially anhydrous and free from gases, and all reactions which would evolve deleterious amounts of gases during welding should be substantially completed before the welding composition is used in the process of the invention. These conditions may be attained by prefusing a mixture of the constituents.

In general, it is possible in the practice of the invention to employ the same welding currents that are employed in the method of welding disclosed in Patent No. 2,043,960. Preferably, alternating current is used, but excellent results may be obtained with direct current.

Figure 3:
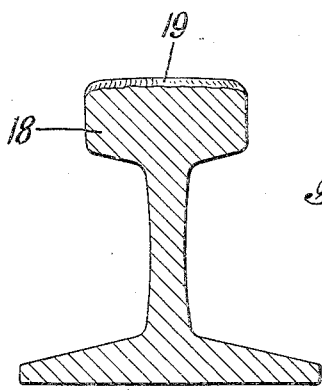
Fig. 3 is a view in cross-section of a railway rail to which a surface layer of metal has been applied by the method of the invention.

The method of the invention has been successfully employed both for building up the surface of a metal workpiece and for depositing metal in a wide groove, as indicated for instance in Figs. 1 and 2. In Fig. 3 a railway rail 18 having an armouring layer 19 of metal is shown as an example of one application of the method of the invention. Electrodes several inches in width have been used and have produced welds of excellent quality exhibiting good penetration and freedom from blowholes and other defects. The process may be operated manually but lends itself readily to automatic operation with suitable electrode holding and feeding devices.

The terms "strip" and "ribbon" as used herein and in the appended claims in referring to the electrode used in the method of the invention mean an electrode which in cross section is materially greater in width than thickness and at least about one inch wide. For most applications an electrode two or more inches wide is preferred.

I claim:

1. A method of welding which comprises establishing on a metal workpiece a layer of a comminuted mineral-like welding composition, which composition is a nonconductor of electricity when in the solid state but a high-resistance conductor when molten; inserting an end of a bare metal electrode in the form of a strip or ribbon of cross section greater in width than thickness and at least about one inch wide in said welding composition; fusing a portion of said composition in contact with said electrode end; passing an electric current through said electrode, fused portion and workpiece, thereby causing metal to be melted from said electrode and deposited on and coalesced with molten metal of said workpiece; and by rocking said electrode bringing its opposite side edges alternately toward and away from said workpiece so that the point of electrical discharge reciprocates from edge to edge of said electrode.

2. A method of welding which comprises establishing on a metal workpiece a layer of a comminuted mineral-like welding composition, which composition is a nonconductor of electricity when in the solid state but a high-resistance conductor when molten; inserting an end of a bare metal electrode in cross section greater in width than thickness and at least about one inch wide in said welding composition; holding said electrode at an acute angle to said workpiece with the unconsumed portion of said electrode overlying the line of intended deposition of metal; fusing a portion of said composition in contact with said electrode end; passing an electric current through said electrode, fused portion and workpiece, thereby causing metal to be melted from said electrode and deposited on and coalesced with molten metal of said workpiece; and rocking said electrode about its central longitudinal axis, while holding said electrode at an acute angle to said workpiece.

3. A method of welding which comprises establishing on a metal workpiece a layer of a comminuted mineral-like welding composition, which composition is a nonconductor of electricity when in the solid state but a high-resistance conductor when molten; inserting an end of a bare metal electrode in cross section greater in width than thickness and at least about one inch wide in said welding composition; holding said electrode at an acute angle to said workpiece with the unconsumed portion of said electrode overlying the line of intended deposition of metal; fusing a portion of said composition in contact with said electrode end; passing an electric current through said electrode, fused portion and workpiece, thereby causing metal to be melted from said electrode and deposited on and coalesced with molten metal of said workpiece; rocking said electrode about its central longitudinal axis, while holding said electrode at an acute angle to said workpiece; and maintaining substantially constant the rate of fusion of said electrode by varying the said angle in response to changes in the voltage drop between said electrode and workpiece.

4. A method of welding which comprises establishing on a metal workpiece a layer of a comminuted mineral-like welding composition, which composition is a nonconductor of electricity when in the solid state but a high-resistance conductor when molten; inserting an end of a bare metal electrode in cross section greater in width than thickness and at least about one inch wide in said welding composition; holding said electrode at an acute angle to said workpiece with the unconsumed portion of said electrode overlying the line of intended deposition of metal; fusing a portion of said composition in contact with said electrode end; passing an electric current through said electrode, fused portion and workpiece, thereby causing metal to be melted from said electrode and deposited on and coalesced with molten metal of said workpiece; rocking said electrode about its central longitudinal axis, while holding said electrode at an acute angle to said workpiece, without substantially moving said electrode along the line of intended deposition, and maintaining substantially constant the rate of fusion of said electrode by varying the said angle in response to changes in the voltage drop between said electrode and workpiece.

5. A method of resurfacing a metal workpiece which comprises depositing metal from a bare metal electrode in cross section greater in width than thickness and at least about one inch wide onto said workpiece through a molten pool of an initially comminuted mineral-like welding composition established on said workpiece, by passing an electric current through said electrode, molten pool and workpiece while maintaining a deep blanket of unfused welding composition over said molten pool and depositing metal, and by rocking said electrode bringing its opposite side edges alternately toward and away from said workpiece.

HARRY SHRUBSALL.

CERTIFICATE OF CORRECTION.

Patent No. 2,357,432. September 5, 1944.

HARRY SHRUBSALL.

It is hereby certified that error appears in the printed specification of the above numbered patent requiring correction as follows: Page 1, first column, line 19, for "found" read --formed--; page 2, second column, line 39, for "be obtained with direct current" read --ing voltage or current--; line 40, for "The method of the invention has been suc-" read --The welding composition employed in the--; and that the said Letters Patent should be read with this correction therein that the same may conform to the record of the case in the Patent Office.

Signed and sealed this 31st day of October, A. D. 1944.

(Seal)

Leslie Frazer
Acting Commissioner of Patents.